United States Patent

Kingsford et al.

[11] Patent Number: 5,997,049
[45] Date of Patent: Dec. 7, 1999

[54] ADJUSTABLE LEAK-TIGHT COUPLING SYSTEM

[75] Inventors: Kenji A. Kingsford, Devore; Peter Nguyen, Garden Grove, both of Calif.

[73] Assignee: Furon Company, Laguna, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/920,373

[22] Filed: Aug. 29, 1997

[51] Int. Cl.$^6$ ..................................................... F16L 25/00
[52] U.S. Cl. ......................... 285/331; 285/349; 285/355; 285/382; 285/901; 285/906; 29/525
[58] Field of Search ...................... 285/331, 355, 285/349, 382, 906, 901; 29/506, 525

[56] References Cited

U.S. PATENT DOCUMENTS

| | | |
|---|---|---|
| 73,039 | 1/1868 | Reed . |
| 588,411 | 8/1897 | Finlayson . |
| 787,144 | 4/1905 | Bropson . |
| 1,591,871 | 7/1926 | Heinrich ................................. 285/331 |
| 2,146,100 | 2/1939 | Walch ................................. 285/906 X |
| 2,238,462 | 4/1941 | Crepeau ................................. 285/331 |
| 2,525,799 | 10/1950 | Hecker ..................................... 251/127 |
| 2,678,835 | 5/1954 | Clark, Jr. .............................. 285/97.5 |
| 2,726,104 | 12/1955 | Boitnott et al. ..................... 285/331 X |
| 3,055,683 | 9/1962 | Appleton ............................. 285/906 X |
| 3,542,381 | 11/1970 | Hait ..................................... 285/349 X |
| 4,134,605 | 1/1979 | Guhne ................................. 285/331 X |
| 4,174,126 | 11/1979 | Hauff ....................................... 285/158 |
| 4,805,944 | 2/1989 | Reginaldo ............................... 285/331 |
| 5,390,965 | 2/1995 | Few ......................................... 285/116 |
| 5,553,902 | 9/1996 | Powers ............................... 285/331 X |
| 5,775,743 | 7/1998 | Rochelle ................................. 285/349 |

FOREIGN PATENT DOCUMENTS

| | | |
|---|---|---|
| 0459713 | 12/1991 | European Pat. Off. . |
| 660363 | 3/1929 | France . |
| 179323 | 12/1906 | Germany . |
| 0249097 | 4/1964 | Netherlands . |
| 6769 | 6/1885 | United Kingdom . |
| 387634 | 2/1933 | United Kingdom . |
| 487796 | 6/1938 | United Kingdom ................... 285/331 |

*Primary Examiner*—Dave W. Arola
*Attorney, Agent, or Firm*—Christie, Parker & Hale, LLP

[57] ABSTRACT

A coupling system comprises a first coupling member having a tongue that projects axially a distance therefrom, and a second coupling member that is threadable attached to the first coupling member. The tongue is inserted within a groove disposed within a second coupling member body. The tongue is axially displaced within the groove by rotation of one of the first or second coupling member relative to the non-rotated coupling member to form a leak-tight seal therebetween. At least one of the first or second coupling member body includes a hollow passage that extends axially therethrough. An elastomeric member is disposed within the groove and is interposed between a base portion of the groove and an end portion of the tongue. The elastomeric member is sufficiently compressible to enable further axial displacement of the tongue within the groove after the leak-tight seal is achieved, thereby providing rotatable adjustment of the first and second coupling members vis-a-vis one another while maintaining such leak-tight seal. The elastomeric member enables the first or second coupling member to be rotatably adjusted from 1 to 360 degrees or more vis-avis the other, after contact between the tongue and elastomeric member, to achieve a desired orientation between the fluid handling members coupling members.

10 Claims, 1 Drawing Sheet

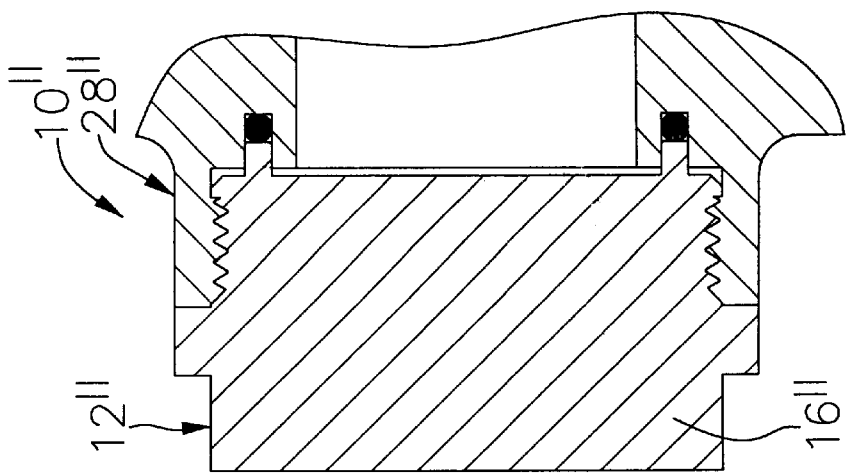
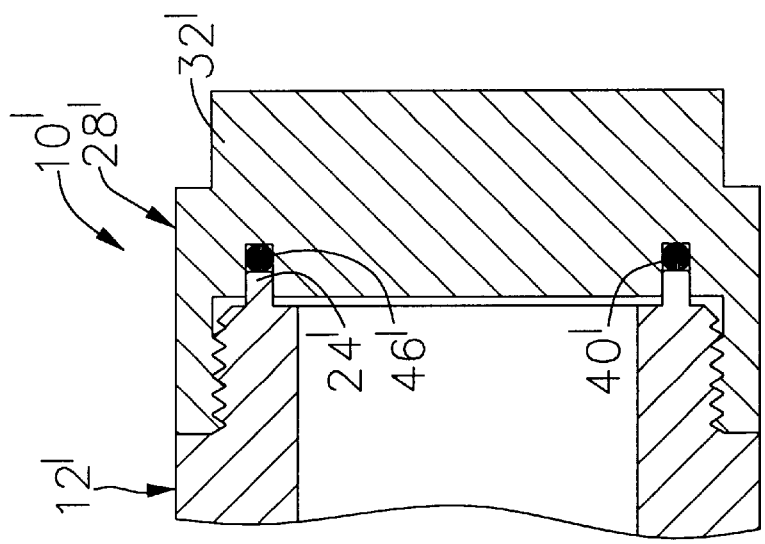
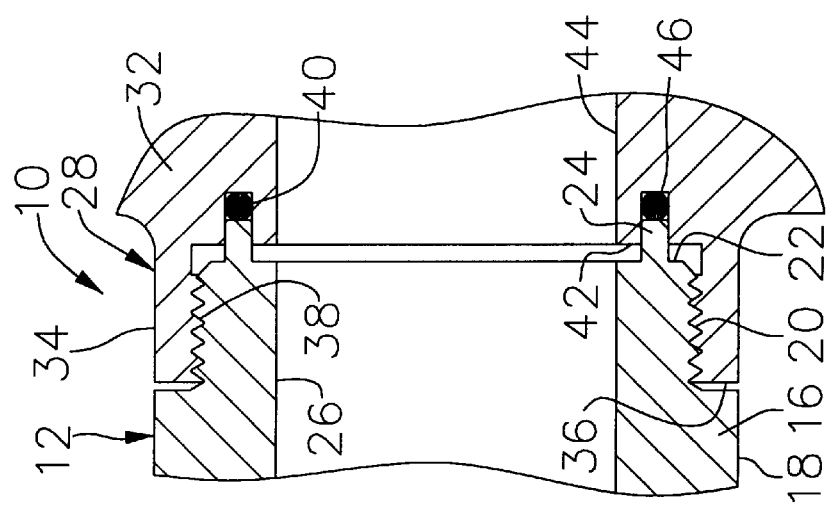

ADJUSTABLE LEAK-TIGHT COUPLING SYSTEM

FIELD OF THE INVENTION

This invention relates to a coupling system that can be used in conjunction with liquid or gas transport or handling systems and, more particularly, to coupling systems that are designed to both provide a leak-tight fitting between two fluid transport or handling members, and enable rotatable adjustment of the fluid transport or handling members to provide a desired alignment vis-vis on another.

BACKGROUND OF THE INVENTION

Coupling systems that are conventionally used to connect fluid handling or transport devices together make use of tubing that is routed between the desired devices, and that is press fit against a surface of the device using a flared- or swage-type fitting. Alternatively, fluid handling or transport devices can be coupled together through the use of cooperating coupling members that extend from the devices themselves. Such integral coupling members are desired for their compact design that allows two or more such fluid handling or transport devices to be coupled together in a space efficient manner.

The use of an integral coupling system is especially desirable in applications such as valve manifolding and the like, where it is oftentimes necessary to arrange multiple valves in fluid flow communication with one another in a confined area of space. In is desirable in such applications that the valves be arranged having a determined rotational orientation vis-a-vis one another to facilitate plumbing for actuation and for fluid transport to and from the valves. For example, to facilitate the routing of pneumatic lines among a plurality of such coupled together valves, it is desired that the valve be coupled together so that each actuation inlet port is positioned facing upwardly in the same direction.

However, the use of conventional integral coupling members to couple together such fluid handling or transport devices are designed only to provide a leak-tight fit when tightened a certain amount, and are unable to maintain a leak-tight fit when the members are untightened or loosened. By the nature of their construction, such conventional integral coupling members may only provide a leak-tight fitting when the coupled devices are in a nonaligned orientation, i.e., when the two devices are not rotatably aligned with one another. Since the orientation of the coupled devices vis-vis one another depends on whether a leak-tight fit is achieved by the coupling member, the use of such conventional coupling members make it difficult if not impossible to achieve both a leak-tight fitting and a desired aligned orientation.

It is, therefore, desirable, that a coupling system be designed that is capable of providing a leak-tight fitting between coupled fluid handling or transport devices, while at the same time providing an adjustment window to permit rotational alignment of the coupled devices to achieve a desired alignment orientation.

SUMMARY OF THE INVENTION

A coupling system prepared according to principles of this invention comprises a first coupling member having a tongue that projects axially a distance way from an end of a first coupling member body. A second coupling member is threadable attached to the first coupling member such that the tongue is inserted within a groove disposed within a second coupling member body. The tongue is axially displaced within the groove by rotation of one of the first or second coupling member relative to the non-rotated coupling member to provide a leak-tight interference seal therebetween. At least one of the first or second coupling member body includes a hollow passage that extends axially therethrough. In the event that the first and second coupling members are used to connect two fluid handling devices, e.g., a valve, each coupling member is integral with a respective fluid handling device and includes a hollow passage extending axially therethrough.

An elastomeric member is disposed within the groove and is interposed between a base portion of the groove and an end portion of the tongue. The elastomeric member is sufficiently compressible to fill any dead volume that exists between an end of the tongue and the groove, and also acts to supplement the seal formed by the tongue and groove upon contact of the tongue thereagainst. The elastomeric member enables the leak-tight seal formed by the tongue and groove to be maintained upon further rotation of one of the first or second coupling member and resulting further insertion of the tongue within the groove. The elastomeric member enables the first or second coupling member to be rotatably adjusted vis-a-vis the other, after contact between the tongue and elastomeric member, to achieve a desired rotational orientation between the connected fluid handling devices or the like. The coupling system of this invention enables such rotatable adjustment between fluid handling devices while maintaining a leak-tight seal therebetween.

BRIEF DESCRIPTION OF THE DRAWINGS

These and other features, aspects, and advantages of the present invention will be more fully understood when considered with respect to the following detailed description, appended claims, and accompanying drawings, wherein:

FIG. 1 is a cross sectional side view of a coupling system of this invention as used to provide flow-through coupling between adjacent fluid handling devices;

FIG. 2 is a cross sectional side view of a coupling system of this invention comprising a female pig to block the flow of fluid from a fluid handling device; and FIG. 3 is a cross sectional side view of a coupling system of this invention comprising a male plug to block the flow of fluid from a fluid handling device.

DETAILED DESCRIPTION

Coupling systems constructed according to principles of this invention are designed to both provide a leak-tight fit between adjacent coupled fluid handling or transport devices while at the same time providing an adjustment window to enable rotating the device vis-a-vis one another to achieve a desired device alignment. Generally, the coupling system comprises a male coupling member that includes a tongue that projects axially therefrom, a female coupling member that includes a groove disposed axially a depth therein, and an annular elastomeric seal that is disposed within the groove. Together, the tongue and groove and elastomeric seal cause a leak-tight seal to be formed between the coupling members, and maintain such leak-tight seal while the coupling members are further rotated vis-vis one another by the compression of the elastomeric seal.

FIG. 1, illustrates an embodiment of the coupling system 10 of this invention as used to provide a leak-tight seal between fluid handling devices coupled for flow-through fluid communication. The coupling system 10 comprises a male coupling member 12 that is integral with a first fluid handling device (not shown), that can be in the form of a valve, pump, or the like. Moving from left to right in FIG. 1, the male coupling member 12 has a cylindrical body 16 having a first diameter section 18 that extends axially a distance to a second diameter section 20 that is sized smaller than the first diameter section. The second diameter section 20 includes an outside surface that is threaded to accommodate attachment with a complementary surface of a female coupling member.

The second diameter section extends axially along the body to form an end 22 of the male coupling member. A tongue 24 extends axially outwardly a distance away from the end 22. The tongue 24 has a thickness and length that is adapted to provide a tight interference fit within a complementary groove in a female coupling member. In an example embodiment, the tongue 24 extends axially away from the end 22 a distance of approximately three millimeters (0.12 inches), and has a thickness of approximately 1.8 millimeters (0.071 inches). The male coupling member body 16 includes a hollow passage 26 that extends therethrough to accommodate fluid flow to and/or from the integral fluid handling device.

A female coupling member 28 is integral with a second fluid handling device (not shown), that can be in the form of a valve, pump, or the like. Moving from right to left in FIG. 1, the female coupling member 28 has a cylindrical body 32 that includes a collar 34 that projects axially away from the body 32 to a terminal end 36. The collar 34 has an inside diameter 38 that is threaded and sized to accommodate threaded interaction with the second diameter section 20 of the male coupling member 12. Moving radially inwardly from the collar inside diameter 38, the female coupling member body 32 includes a groove 40 that is disposed a depth into a shoulder 42. The groove 40 has a thickness and depth that is sized to provide a tight interference fit with the male coupling member tongue 24. In an example embodiment, the groove 40 is sized having a thickness of approximately 1.75 millimeters (0.069 inches), and a depth of approximately 3.5 millimeters (0.135 inches). The groove 40 is intentionally sized slightly smaller than the tongue to provide a tight interference fit therebetween when the female and male coupling members are joined together by cold flow of the coupling member material.

Moving radially inwardly from the groove 40, the female coupling member 28 comprises a hollow passage 44 that extends axially therethrough to facilitate fluid passage to and/or from the integral fluid handling or transport device.

In applications where the fluid being transferred between the coupling members is a corrosive, acidic or caustic process chemical, it is desired that the coupling members be selected from a fluoropolymer compound from the group of fluoropolymers including but not limited to polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like. A particularly preferred fluoropolymer material is Teflon® PFA or Teflon® PTFE, which are provided by DuPont Company of Wilmington, Del. Such materials are not damaged by corrosive, acidic, or caustic liquids, and do not introduce contamination into chemically pure liquids. In an example embodiment, each coupling member is formed from Teflon® PTFE. The coupling members can be made by either machine or mold process, depending on the economics of the manufacturing process.

In an example embodiment, the coupling members are molded. Alternatively, coupling members of this invention can be formed from such conventional materials as metal and metal alloys in those applications permitting their use.

Referring still to FIG. 1, an elastomeric member 46 in the form of an annular ring is disposed within the groove 40 and is seated at a base of the groove. The elastomeric member 46 is interposed between the base of the groove 40 and an end of the tongue 24. The elastomeric member can be made from well known elastomeric materials that are capable of providing a desired degree of elastomeric compression when the male coupling member tongue is pushed into the female coupling member groove. In an example embodiment, the elastomeric member 46 is made from is made from fluoroelastomers such as Viton and Kalrez, both of which are available from DuPont of Wilmington Delaware, or Kel-F available from 3M.

The elastomeric member 46 can have a geometric or circular cross-sectional profile. For example, the elastomeric member can be in the form of an O-ring, square ring, a quad ring or squeeze ring. It is desired that the elastomeric member 46 be sized having a radial thickness slightly smaller than that of the female coupling member groove 40 to facilitate its placement therein. In an example embodiment, the elastomeric member 46 is in the form of an O-ring having a circular cross-sectional profile, and having a diameter of approximately 1.75 millimeters. It is desired that the elastomeric member 46 have an axial dimension sufficient to prevent the end of the tongue 24 from bottoming out against the shoulder 42 of the female coupling member 28 when the tongue is engaged within the groove, and to completely fill the space between the groove and tongue to eliminate any dead volume within the groove.

It is also desired that the elastomeric member 46 have an axial dimension that is sufficient to provide a desired degree of elastomeric compression in response to the tongue 24 being inserted within the groove 40. For example, it is desired that the elastomeric member be capable of compressing a sufficient amount after the tongue has contacted the elastomeric member to enable the male or female coupling member to be rotatably adjusted vis-a-vis the other complementary coupling member from 1 degree to 360 degrees or more as the tongue is further inserted within the groove. The ability to achieve a desired degree of rotatable adjustment between the coupling members is a function of both the axial elastomeric member dimension and the pitch of the threads on each male and female coupling member. For example, the smaller the pitch the greater the rotational adjustment between coupling member, for a given elastomeric member.

The coupling system is assembled by inserting the elastomeric member within the groove, placing the male coupling member first diameter section 20 within the female coupling member collar 34, and rotating the male or female coupling member vis-a-vis the other coupling member to cause the adjacent threaded surfaces of the first diameter section and collar to engage on another. The male or female coupling member is further rotated about the other such coupling member until the tongue engages the groove and is inserted therein. One of the coupling members is further rotated about the other so that the tongue is further inserted within the groove and makes contact with the elastomeric member to form a leak-tight seal therebetween. Contact between the tongue and the elastomeric member is detected by the user in the form of a slight resistance to the rotational movement. Once such resistance is detected, a user can further rotate one of the coupling members about the other such coupling member until a desired rotational alignment or orientation vis-a-vis integral fluid handling devices is achieved. The further insertion of the tongue within the groove during such aligning rotational movement is enabled by compression of the elastomeric member between the tongue and groove, which acts to fortify the leak-tight seal.

Once the tongue makes contact with the elastomeric member a leak-tight seal is formed by the interference fit between the tongue and groove, and the further insertion of the tongue within the groove does not upset this. However, the ability of the elastomeric member to compress and allow further insertion of the tongue within the groove is desirable because it allows for the integral fluid handling devices to be rotated into a desired orientation within one another without compromising such leak-tight seal. In an example embodiment, an elastomeric member diameter of approximately 1.75 millimeters is sufficient to prevent such bottoming out from occurring and to provide a desired degree of elastomeric compression to provide a desired rotational adjustment window.

FIG. 2 illustrates an embodiment of a coupling system 10' that is used to block off fluid flow from a fluid handling or transport device. In such embodiment, the male coupling member 12' is identical to that described above and illustrated in FIG. 1. The female coupling member 28', however, is different from that described above and illustrated in FIG. 1 in that it does not include a hollow fluid passage therethrough. Rather, the female coupling member 28' comprises a body 32' having a solid central section that is in the form of a solid plug. An adjustable leak-tight fitting is provided by such embodiment in the same manner described and illustrated above, i.e., by the combined use of the tongue 24', grove 40' and elastomeric member 46'.

FIG. 3 illustrates an embodiment of a coupling system 10" that is also used to block off fluid flow from a fluid handling or transport device. In such embodiment, the female coupling member 28" is identical to that described above and illustrated in FIG. 1. The male coupling member 12", however, is different from that described above and illustrated in FIG. 1 in that it does not include a hollow fluid passage therethrough. Rather, the male coupling member 12" comprises a body 16" having a solid central section that is in the form of a solid plug. An adjustable leak-tight fitting is provided by such embodiment in the same manner described and illustrated above, i.e., by the combined use of the tongue, grove and elastomeric member.

A key feature of coupling systems of this invention is the use of an elastomeric member in conjunction with a tongue and groove sealing arrangement to provide a rotationally adjustable leak-tight seal between coupled fluid handling or transport devices. The elastomeric member performs the functions of: (1) supplementing the leak-tight seal between the tongue and groove; (2) being elastomerically compressible to enable such leak-tight seal to be maintained within a window of tongue placement depth within the groove, thereby enabling rotational adjustment of the coupling members while maintaining the leak-tight seal; and (3) eliminating unwanted hold-up volume within the groove. Coupling systems of this invention, for a typical application, are designed to provide an adjustable leak-tight fitting under internal pressure conditions of up to about 250 psig., when formed from polymeric materials. However, coupling systems of this invention can provide an adjustable leak-tight fitting under much greater internal pressures when formed from metal materials.

The above description of preferred embodiments of coupling systems of the present invention are for illustrative purposes, and can be used in a number of different fluid transport or fluid handling coupling applications. For example, coupling systems of this invention can be used to couple together not only valves, but pumps, fluid fittings, heat exchangers, manifolds, headers and the like. Because of variations which will be apparent to those skilled in the art, the present invention is not intended to be limited to the particular embodiments described above. The scope of the invention is defined in the following claims.

What is claimed is:

1. A coupling system comprising:
   a first coupling member having:
      a tongue that projects axially a distance way from an end of a first coupling member body;
   a second coupling member having:
      a groove disposed axially a distance within a body of the second coupling member, wherein the tongue is disposed within the groove, and wherein the tongue has a width between parallel wall surfaces that is wider than parallel wall surfaces of the groove to form an interference fit between adjacent tongue and groove wall surfaces that provides a leak-tight seal between the coupling members; and
      means for engaging a complementary surface of the first coupling member that enables the tongue to be axially displaced within the groove by rotating one of the first or second coupling member relative to the other of the first or second coupling member; and
   an elastomeric ring member disposed within the groove and interposed between a base portion of the groove and an end portion of the tongue, wherein the elastomeric member is sufficiently compressible to enable further rotation of the first or second coupling member after contacted by the tongue;
   wherein the leak-tight seal between the coupling members provided by the engagement of the tongue into the groove is independent of any tightening force between the coupling members, and wherein the leak-tight seal is maintained as the coupling members are rotated relative to one another.

2. The coupling system as recited in claim 1 wherein the first and second coupling members are each integral with respective first and second fluid handling devices.

3. The coupling system as recited in claim 1 wherein the elastomeric member is a ring seal having a symmetrical cross sectional geometry.

4. The coupling system as recited in claim 1 wherein the first and second coupling members are each formed from a fluoropolymeric material.

5. A coupling system for providing an adjustable leak-tight fitting comprising:
   a male coupling member having a body that includes:
      a threaded outside surface that extends axially along the body to an end of the body;
      a tongue that projects axially a distance away from the end of the body; and
      a hollow passage positioned radially inwardly from the tongue that extends axially through the body;
   a female coupling member having a body that includes:
      a collar that extends axially away from the body, that is disposed concentrically around the threaded outside surface of the male coupling member, and that is threadably engaged therewith;
      a groove disposed axially a depth within the female coupling member body, wherein the tongue has a wall thickness that is greater than a wall thickness of the groove to form an interference seal therein that provides a leak-tight seal between the coupling members; and a hollow passage positioned radially inwardly from the groove that extends axially through the body, and that is collinear with the hollow passage through the male coupling member;

an elastomeric member interposed between and in contact with the tongue and groove, wherein the elastomeric member is formed from a material that is sufficiently compressible to accommodate further axial displacement of the tongue within the groove after initial contact between the tongue and the elastomeric member;

wherein the leak-tight seal between the coupling members is provided independent of any tightening force between the coupling members and is maintained as the coupling members are rotated about one another.

6. The coupling system as recited in claim 5 wherein the male and female coupling members are each integral with respective first and second fluid handling devices.

7. The coupling system as recited in claim 5 wherein the elastomeric member is in the form of an O-ring seal.

8. The coupling system as recited in claim 5 wherein the first and second coupling members are each formed from a fluoropolymeric material.

9. A method for forming a leak-tight seal between coupled fluid handling members independent of tightening force between the two members comprising the steps of:

threadably engaging a first coupling member to a second coupling member;

inserting a tongue of the first coupling member axially into a groove of the second coupling member by rotating the first or second coupling member relative to the other coupling member, wherein the tongue has a wall thickness greater than that of the groove to provide an interference fit therebetween that forms a leak-tight fitting between the coupling members;

contacting the tongue against an elastomeric member disposed within the groove; and maintaining the leak-tight seal between the coupling members independent of tightening force between the coupling members, and independent of the rotational orientation of the coupling members relative to one another.

10. The method as recited in claim 9 wherein during the maintaining step, the leak-tight seal is maintained while one of the first or second coupling member is rotated relative to the non-rotated in the range of from 1 to 360 degrees.

* * * * *